United States Patent
Hillenbrand

(10) Patent No.: US 10,682,936 B1
(45) Date of Patent: Jun. 16, 2020

(54) LUMBAR SUPPORT CUSHION

(71) Applicant: Stephen Hillenbrand, San Rafael, CA (US)

(72) Inventor: Stephen Hillenbrand, San Rafael, CA (US)

( * ) Notice: Subject to any disclaimer, the term of this patent is extended or adjusted under 35 U.S.C. 154(b) by 0 days.

(21) Appl. No.: 16/125,721

(22) Filed: Sep. 9, 2018

(51) Int. Cl.
*A47C 7/46* (2006.01)
*B60N 2/66* (2006.01)
*B60N 2/64* (2006.01)

(52) U.S. Cl.
CPC ............. *B60N 2/663* (2015.04); *B60N 2/646* (2013.01)

(58) Field of Classification Search
CPC .. A47C 7/46; A47C 7/282; A47C 7/54; A47C 7/14; A47C 7/40; A47C 7/425; A47C 7/462; A47C 7/72; A47C 27/148; B60N 2/66; B60N 2/686; B60N 2/665; B60N 2/68; A61H 2205/081; A47G 9/10; A47G 9/1027
See application file for complete search history.

(56) References Cited

U.S. PATENT DOCUMENTS

| | | | | |
|---|---|---|---|---|
| 4,431,232 A * | 2/1984 | Hannouche | ............ | A47C 7/425 297/284.5 |
| 4,810,034 A * | 3/1989 | Beier | ...................... | A47C 7/425 297/230.14 |
| 4,916,765 A * | 4/1990 | Castronovo, Jr. | ..... | A47G 9/1081 297/284.1 |
| 4,928,335 A * | 5/1990 | Pedrow | ..................... | A47G 9/10 5/421 |
| 5,033,137 A * | 7/1991 | Pedrow | ..................... | A47G 9/10 5/636 |
| 5,452,940 A * | 9/1995 | Maier | ...................... | A47C 7/46 297/452.32 |
| 5,474,362 A * | 12/1995 | Albecker, III | ........... | A47C 7/46 297/284.4 |
| 5,836,653 A * | 11/1998 | Albecker | ............... | A47C 1/146 297/452.31 |
| 6,299,248 B1 * | 10/2001 | Gennaro | ................ | A47C 7/425 297/219.1 |
| 6,688,686 B1 * | 2/2004 | McEvoy | .................. | A47C 7/46 264/46.4 |
| 7,147,279 B2 * | 12/2006 | Bevan | ..................... | A47C 7/425 297/180.12 |
| 7,267,408 B2 * | 9/2007 | Xiang | ...................... | A47C 5/02 144/333 |
| 8,485,603 B2 * | 7/2013 | Albecker | ................. | A47C 7/40 297/284.4 |
| 8,931,837 B2 * | 1/2015 | Vernon | .................. | A47C 7/425 297/230.1 |
| 9,033,416 B1 * | 5/2015 | Vanderhorst | ............. | A47C 7/46 297/284.5 |

(Continued)

*Primary Examiner* — Shin H Kim

(74) *Attorney, Agent, or Firm* — Savantek Patent Services; Ivan E. Rozek

(57) ABSTRACT

A lumbar support cushion with a cushion cover capable of forming an L shaped cushion that fits on a chair or vehicle seat. A cushion cover encloses a poly foam padding member and more polyethylene closed cell foam lumbar support member. The cushion cover includes a hinged flap to allow for the insertion and removal of the lumbar support member. In a preferred embodiment, the lumbar support member is D shaped In one embodiment the D shaped lumbar support member is comprised of a plurality of nesting D shaped members.

4 Claims, 5 Drawing Sheets

(56) References Cited

U.S. PATENT DOCUMENTS

| | | | |
|---|---|---|---|
| 9,295,599 B2 * | 3/2016 | Dyevich | A61G 7/05715 |
| D779,251 S * | 2/2017 | Beyer | D6/716.4 |
| 2001/0022459 A1 * | 9/2001 | Matsushima | B60N 2/80 |
| | | | 297/284.4 |
| 2009/0236888 A1 * | 9/2009 | Chew | A47C 7/425 |
| | | | 297/284.5 |
| 2012/0280545 A1 * | 11/2012 | Vernon | A47C 7/425 |
| | | | 297/230.1 |
| 2019/0143864 A1 * | 5/2019 | Gay | B60N 2/7088 |
| | | | 297/284.6 |

* cited by examiner

LUMBAR SUPPORT CUSHION

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of portable cushions and more specifically to a support adjustable lumbar support cushion.

Portable back cushions for use while seated on a chair or the seat of a vehicle are well known.

When driving long distances, or sitting in a chair for long periods of time, a person's lumbar area can benefit from extra cushioning support.

Some cushions offer the option of changing the degree of support by inflating or deflating a pillow located in the lumbar area. However, inflatable cushions do not offer the same degree of comfort as resilient foam cushions. Therefore, it would be a novel advantage to have a lumbar support cushion that is made of a resilient material, and can be quickly removed and replaced by smaller or larger lumbar support members according to the user's needs and comfort requirements.

BRIEF SUMMARY OF THE INVENTION

The primary object of the invention is to provide a lumbar support cushion that allows the user to easily remove and replace the lumbar support component with larger or smaller supports.

Another object of the invention is to provide a lumbar support cushion where the lumbar support is made from closed cell polyethylene foam.

Another object of the invention is to provide a lumbar support cushion where a plurality of support members nest into one another to allow for different degrees of support.

A further object of the invention is to provide a lumbar support cushion where the support member is D shaped to provide ideal back support.

Yet another object of the invention is to provide a lumbar support cushion where the D shaped support member is hollow to provide greater resiliency.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a lumbar support cushion comprising: a cushion cover capable of forming an L shaped cushion, a poly foam padding member, one or more polyethylene closed cell foam lumbar support members, said foam padding member and said lumbar support member enclosed within said L shaped cushion cover, said cushion cover including an integral hinged flap to allow for the insertion and removal of said lumbar support member, and said hinged flap being held closed by a hook and loop closure member.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS AND PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
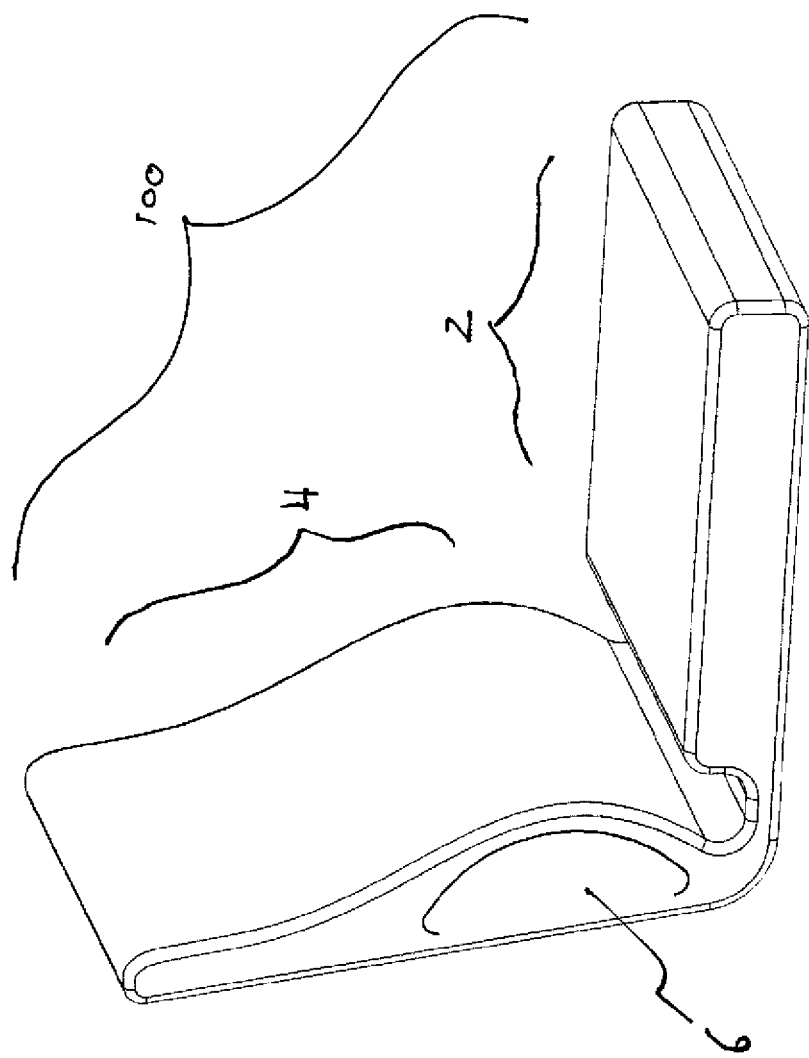
FIG. 1 is a perspective view of the invention.

Referring now to FIG. 1 we see a perspective view of the invention 100. The overall cushion is L shaped and can fit on a typical chair or vehicle seat. The bottom portion of the L shape 2 can help provide cushioning for the user's bottom and thighs. The back portion of the cushion 4 provides cushioning for the user's back. A wider portion of the back provides lumbar support. The D shaped flap 6 covers an opening in the cushion that allows the user to insert or remove an extruded D shaped portion 12 of closed cell polyethylene foam.

Figure 2:
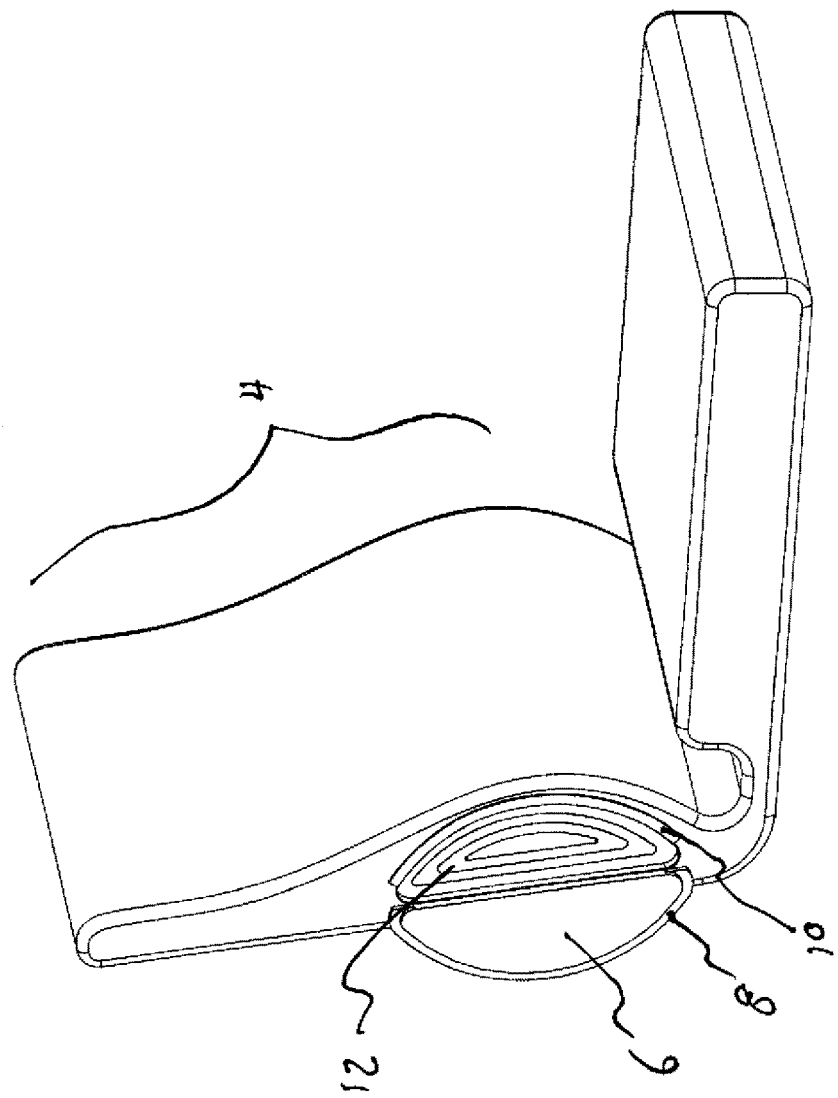
FIG. 2 is a perspective view of the invention with the lumbar cushion flap opened.

FIG. 2 is a perspective view of the invention 100 where the flap 6 is in the open position and ready to accept a lumbar support member 12. The flap 6 is releasably attached to the main cushion cover by means of hook and loop type fasteners 8, 10 or other standard fastening system such as hooks, magnets or snap fasteners.

Figure 3:
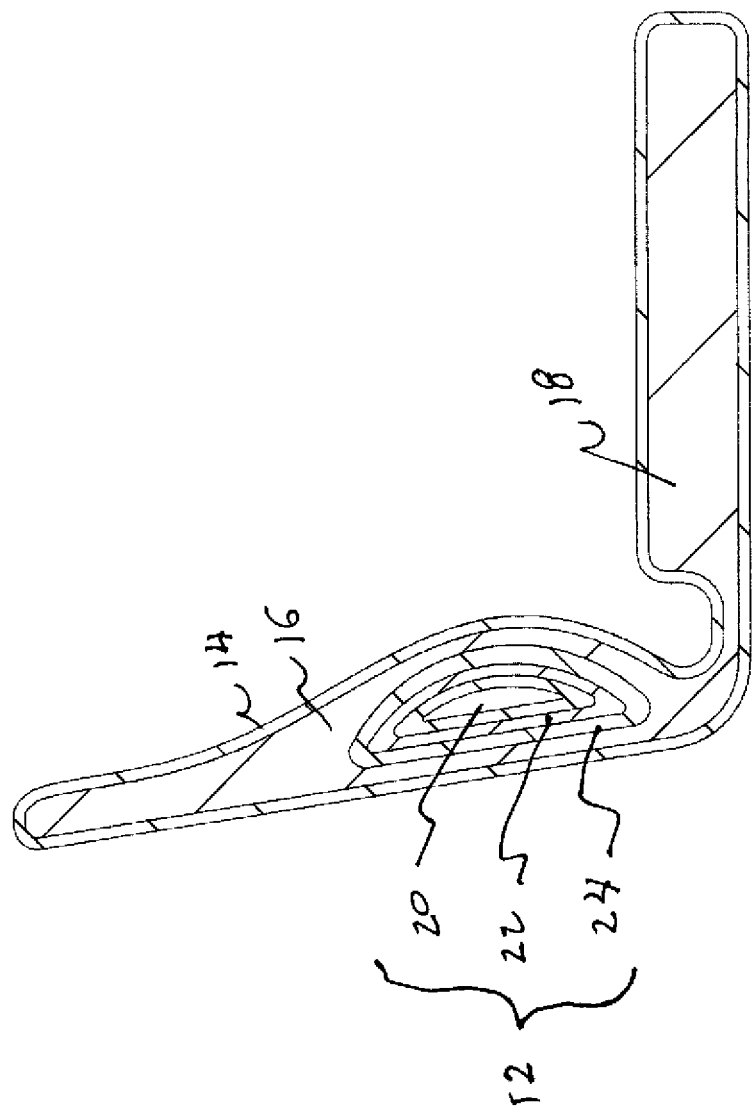
FIG. 3 is a section view of the invention.

FIG. 3 is a side section view of the invention 100 showing the outer fabric cover 14, the inner polyfoam cushion members 16, 18 and the D shaped polyethylene lumbar support members 20, 22, 24 forming lumbar support member 12. The D shaped lumbar support members 20, 22, 24 are nested within each other so that the user can elect to use one or more of the D shaped cushions 20, 22, 24 as so desired depending on the amount of support needed.

Figure 4:
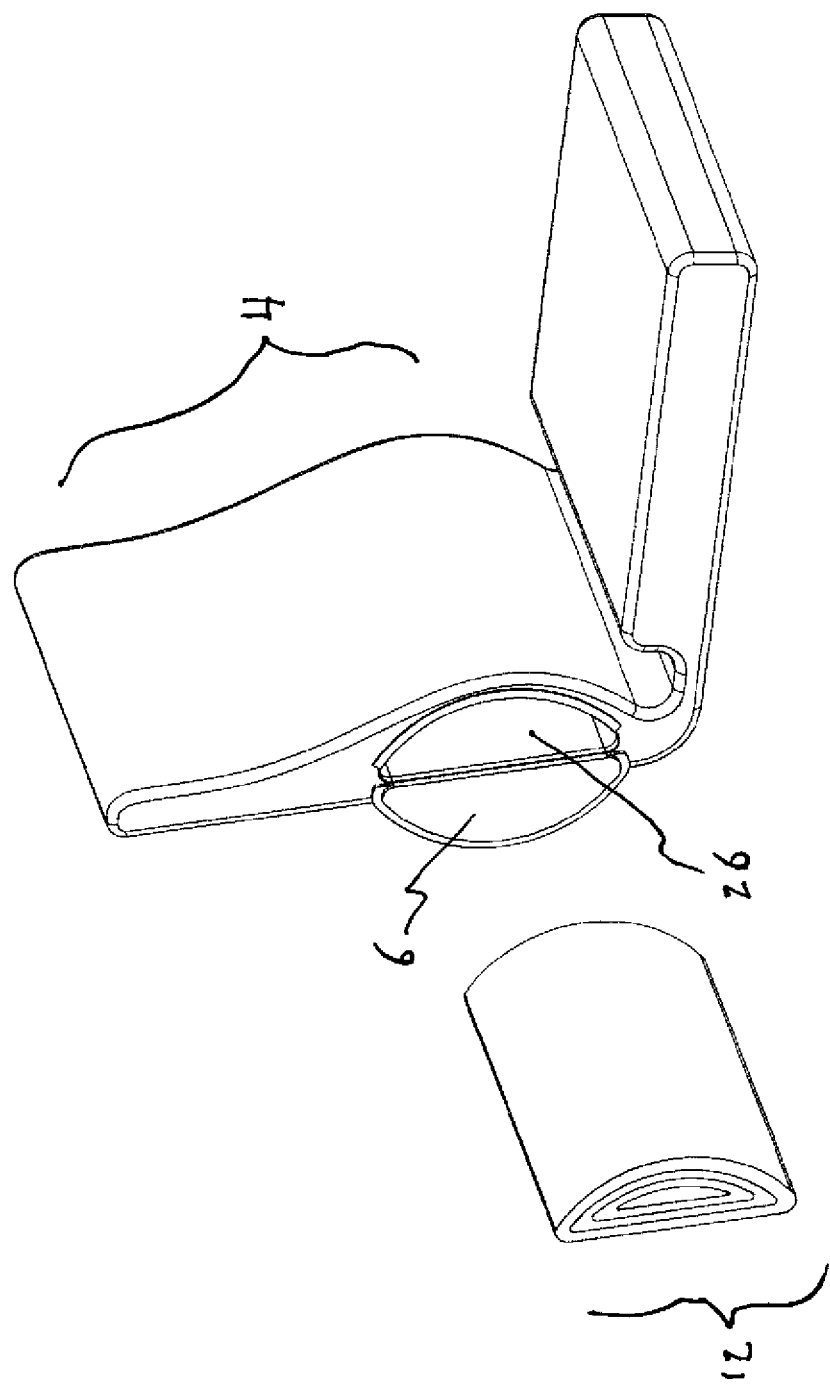
FIG. 4 s an exploded view showing the D shaped lumber member removed from the main cushion.

FIG. 4 is an exploded perspective view of the invention showing the D shaped cushion 12 about to be inserted into the aperture 26 of main cushion back 4.

Figure 5:
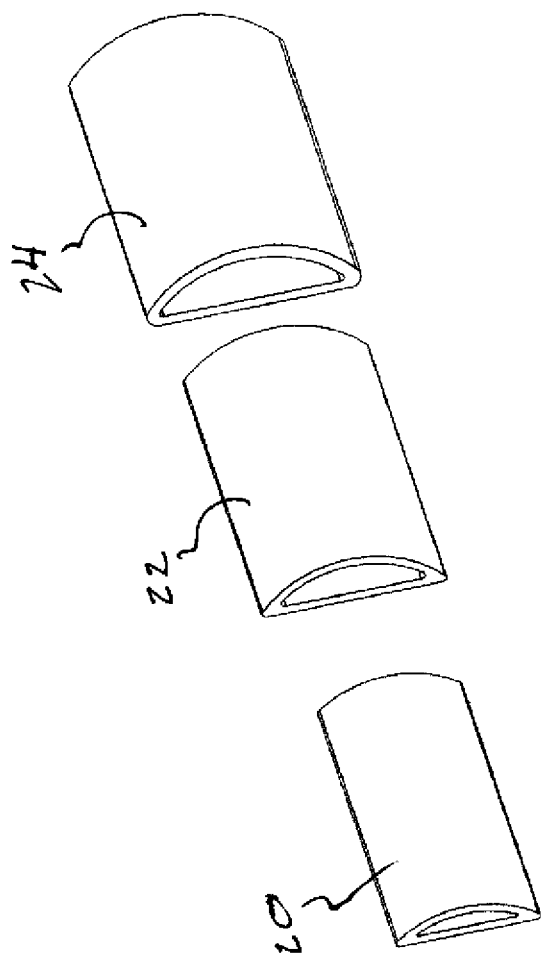
FIG. 5 is an exploded view of the nesting lumbar cushions.

FIG. 5 is an exploded perspective view showing how the D shaped cushions 20. 22. 24 are nested one within the other so that the user can choose to use one, two or three of the D shaped cushions depending on the user's comfort needs.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A lumbar support cushion comprising:
   a cushion cover capable of forming an L shaped cushion;
   a poly foam padding member;
   one or more polyethylene closed cell foam lumbar support members;
   said foam padding member and said lumbar support member enclosed within said L shaped cushion cover;
   said cushion cover including an integral hinged flap to allow for the insertion and removal of said lumbar support member; and
   said hinged flap being held closed by a hook and loop closure member.

2. A lumbar support cushion as claimed in claim 1 wherein said lumbar support member is D shaped.

3. A lumbar support cushion as claimed in claim 2 wherein said D shaped lumbar support member is comprised of a plurality of nesting D shaped members.

4. A lumbar support cushion as claimed in claim 2 wherein said D shaped members are hollow to provide additional resilience.

* * * * *